G. W. MORRIS.
LUBRICANT INDICATOR.
APPLICATION FILED FEB. 1, 1918.
1,325,032.
Patented Dec. 16, 1919.
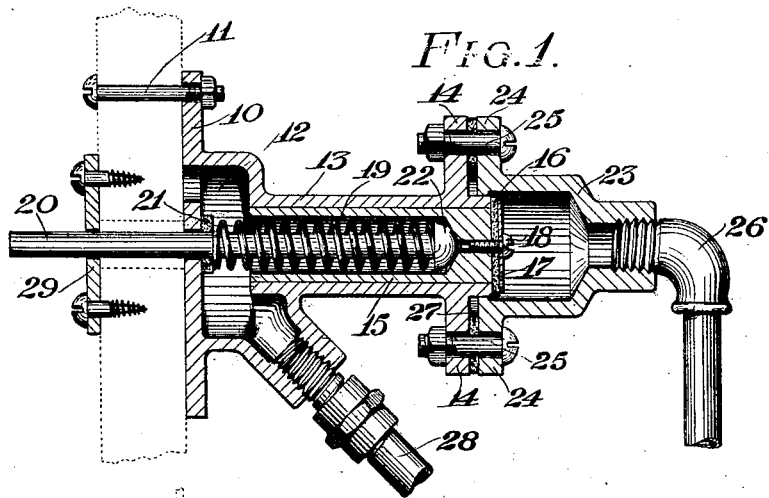
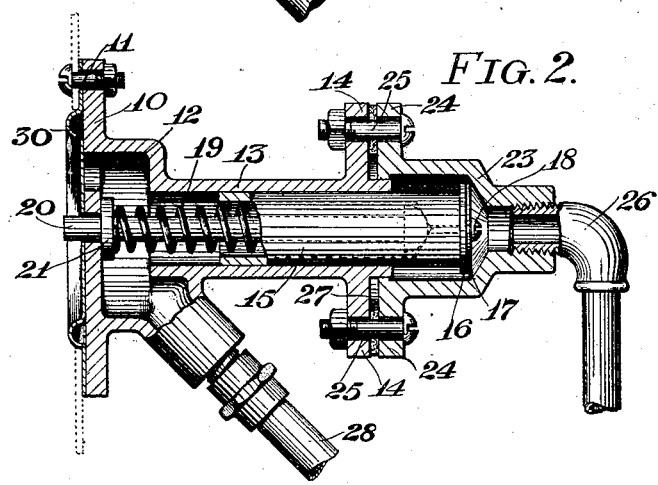
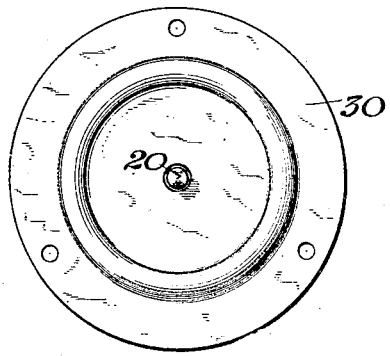
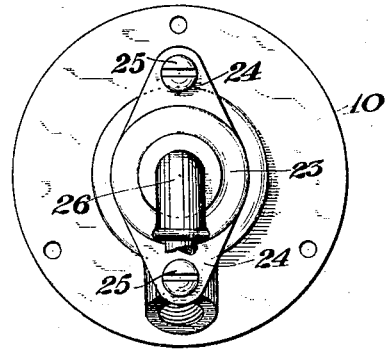
WITNESSES.
C. L. Waal
H. W. Chase
INVENTOR.
George W. Morris
By R. S. Caldwell
ATTORNEY.

UNITED STATES PATENT OFFICE.

GEORGE W. MORRIS, OF RACINE, WISCONSIN.

LUBRICANT-INDICATOR.

1,325,032.   Specification of Letters Patent.   Patented Dec. 16, 1919.

Application filed February 1, 1918. Serial No. 214,879.

*To all whom it may concern:*

Be it known that I, GEORGE W. MORRIS, a subject of the King of Great Britain, and resident of Racine, Racine county, Wisconsin, have invented new and useful Improvements in Lubricant-Indicators, of which the following is a description, reference being had to the accompanying drawings, which are a part of this specification.

This invention has for its object to simplify the construction and to reduce the cost of manufacture of indicators of the type wherein a plunger is subjected to the variations in pressure in the lubricating supply system of an automobile to protrude more or less according to the pressure in the lubricating supply system and so indicate the presence of oil in the system and the proper operation of the lubricant pump.

With the above and other objects in view the invention consists in the lubricant indicator, its parts and combinations of parts as herein claimed and all equivalents.

Referring to the accompanying drawings, in which like characters of reference indicate the same parts in different views:

Figure 1 is a longitudinal sectional view of a lubricant indicator constructed in accordance with this invention with the plunger in its extended position;

Fig. 2 is a similar view with the plunger in its retracted position;

Fig. 3 is a front view of the device as shown in Fig. 2; and

Fig. 4 is a rear view thereof.

In these drawings 10 indicates a front plate which may be secured by means of bolts 11 to the back of a wooden instrument board as shown in Fig. 1, or to the back of a metal instrument board as shown in Fig. 2. This front plate 10 is preferably formed of a casting which is cored to produce a drain cavity 12 at the rear of the front plate with a cylinder 13 projecting rearwardly therefrom and having clamping ears 14 a short distance from its rear end. The interior of the cylinder 13 is carefully finished to form a close working fit with a plunger 15 which is slidable therein. The projecting flange forming the end of the cylinder may be ground smooth to form a valve seat against which a valve 16 on the end of the plunger tightly fits at the end of the outward stroke of the plunger, said valve consisting of a leather washer held in place on the end of the plunger by a metal washer 17 forming a backing therefor and a screw 18 threaded into the end of the plunger.

The plunger is urged rearwardly away from this seated position of the valve by means of a coil spring 19 within the bore of the plunger and surrounding an indicator stem 20 which passes out through an opening in the front plate and the instrument board, one end of the coil spring bearing against a felt washer 21 surrounding the indicator stem and the other end bearing against a head 22 of the indicator stem.

The rearward movement of the plunger under the action of the spring is arrested by the engagement of the valve 16 or its washer 17 with the reduced end of a pressure chamber 23 which fits around the projecting end of the cylinder 13 and is provided with a pair of clamping ears 24 which are clamped to ears 14 by clamping screws 25 passing through them. The pressure chamber 23 has a pipe connection 26 leading to it from the lubricating system through which oil is forced under pressure to the various parts of the mechanism to be lubricated and consequently oil under pressure is delivered through said pipe connection to the pressure chamber 23 and the pressure is exerted upon the plunger 15, the connection between the pressure chamber and the cylinder being made tight by a leather gasket 27 between their connecting flanges.

The outward movements of the plunger under the influence of the pressure of the oil in the pressure chamber are resisted by the coil spring 19, but this resistance is so determined as to yield under the normal pressure in the lubricating system and permit the plunger to move to the position shown in Fig. 1 where its valve 16 becomes seated on the valve seat formed by the end of the cylinder. The tight working fit of the plunger in the cylinder prevents a waste of oil by leakage between them and the valve 16 on the plunger seating on the end of the cylinder further prevents such waste, especially in cases where the indicator is used in connection with a rotary oil pump by which the pressure is maintained. There will in any event, however, be a slight leakage of oil which at times only amounts to a drop of oil in several days, and it is desired to drain whatever oil does leak past the piston and conduct it away to prevent its reaching the indicator stem and being carried to the front of the instrument board where it might soil the hands or clothing. The drain cavity 12 is, therefore, provided at the front end of the cylinder and is connected to a drain pipe 28 for conducting the lubricant therefrom to any place desired.

When the device is attached to a wooden instrument board as shown in Fig. 1, a disklike escutcheon 29 may surround the indicator stem 20 to give a finished appearance and to serve as a guide. When the engine is idle or for any other reason the lubricating system is not in operation, the end of the indicator stem 20 will lie approximately flush with or close to the escutcheon 29, but under normal operating conditions it is projected to the position shown in Fig. 1 by the pressure of oil in the pressure chamber 23. Its position, therefore, indicates the condition of the lubricating system and gives warning in the event of the lubricant supply becoming exhausted or the failure of the pump to operate for any reason. In use with a rotary pump the indicator stem moves to its outer position and remains there with the valve 16 fitting on its seat as long as the operation continues, but in use with a reciprocating pump the indicator stem responds to each pulsation of the pump to indicate the condition of the lubricating system.

Instead of being applied to the back of a wooden instrument board as in Fig. 1, the front plate 10 may be attached to the rear of a metal instrument board, as shown in Fig. 2. In such case, however, it is desirable to fit the instrument to a comparatively large opening in the instrument board with a beaded escutcheon plate 30 between the edge of the opening and the front plate 10 with the circular bead thereof fitting against the edge of the opening.

The details of construction of the present invention have been designed to reduce the cost of manufacture and increase the efficiency of the device. The cylinder only requires a reaming operation, and the plunger is merely a section cut from a rod with the spring receiving bore drilled in one end and the other end tapped to receive the valve securing screw. The valve seat is produced by grinding the end of the cylinder, and the pressure chamber 23 and the drain chamber 12 are tapped for their pipe connections. This simplicity of construction reduces the cost of manufacture and increases the durability of the device, facilitating repairs and simplifying installation. The pressure chamber 23 because of its flange connection with the cylinder, with the gasket therebetween, avoids the necessity for the use of a union in the pipe connection leading therefrom, as it may be threaded on the pipe connection and then bolted to the cylinder.

The valve formed by the leather washer overreaching the end of the plunger and backed by the metal washer not only prevents leakage of the oil in the manner stated but it is also designed to reduce the cost of manufacture and to increase the efficiency of the device, and furthermore it serves to silence the end of the stroke of the plunger so that there is no objectionable click produced as might be the case with other valve constructions with each pulsation of the lubricant pump.

What I claim as new and desire to secure by Letters Patent is:

1. A lubricant indicator, comprising a cylinder, a pressure chamber surrounding an end of the cylinder and adapted for connection with a pressure feed lubricating system, a plunger working within the cylinder, a valve on the end of the plunger and traveling within the pressure chamber and seated on the end of the cylinder, means for moving the plunger to carry the valve away from its seat, and an indicator stem moving with the plunger to indicate its movements.

2. A lubricant indicator, comprising a cylinder, a pressure chamber adapted for connection with a pressure feed lubricating system and having an opening receiving the end of the cylinder, flanges on the cylinder and the pressure chamber respectively, bolts connecting said flanges, a gasket held between the flanges, a plunger working in the cylinder, a valve on the end of the plunger seated on the end of the cylinder, and an indicator stem moving with the plunger to indicate the movements thereof.

3. A lubricant indicator, comprising a cylinder, a pressure chamber receiving the end of the cylinder and having tight connection therewith and adapted for connection with a pressure feed lubricating system, a plunger working in the cylinder, a flexible valve member secured to the end of the plunger and seated on the end of the cylinder within the pressure chamber, means for moving the plunger into the pressure chamber, and an indicator stem moving with the plunger to indicate the movements thereof.

4. A lubricant indicator, comprising a cylinder, a pressure chamber receiving the end of the cylinder and having a tight fit therewith and adapted to have connection with a force feed lubricating system, a plunger working within the cylinder, a leather washer on the end of the plunger within the pressure chamber, a metal washer bearing thereon, a screw passing through the washers and engaging the plunger, and an indicator stem bearing on the plunger with pressure to indicate the movements thereof.

5. A lubricant indicator, comprising a cylinder, a pressure chamber having the end of the cylinder projecting therein and adapted for connection with a system for supplying lubricant under pressure, a plunger working in the cylinder of uniform external diameter and having an opening through one end, a valve member secured to the closed end of the plunger and seated on the end of the cylinder, and an indicator stem seated with spring pressure within the opening of the plunger to indicate the movements of the plunger.

6. A lubricant indicator, comprising a cylinder, a pressure chamber having the end of the cylinder projecting therein and forming a tight connection therewith, said pressure chamber having connection with a force feed lubricating system, a plunger of uniform external diameter fitting in the cylinder and having an opening through one end, a leather washer of larger diameter than the plunger secured to the other end of the plunger and forming a valve seated on the end of the cylinder, and a spring-pressed indicator stem seated in the opening of the plunger for indicating the movements of the plunger.

7. A lubricant indicator, comprising a casting forming a cylinder with a drain chamber at one end, a flange on the casting a short distance from the other end of the cylinder, a pressure chamber having an internal flange fitting around the end of the cylinder and having an external flange secured to the flange of the cylinder, a gasket clamped between the securing flanges of the pressure chamber and the cylinder, means for connecting the pressure chamber with a force feed lubricating system, a plunger fitting within the cylinder, a valve carried on the end of the plunger and seated on the end of the cylinder within the pressure chamber, and a spring-pressed indicator stem passing through the wall of the drain chamber and bearing on the plunger for indicating the movements of the plunger.

8. A lubricant indicator, comprising a casting forming a cylinder with a drain chamber at one end and a front plate thereon adapted to be secured to the back of an instrument board of an automobile or the like, a flange on the cylinder near the other end thereof, a pressure chamber having an internal flange fitting around the end of the cylinder and having an external flange secured to the flange of the cylinder, a gasket clamped between the securing flanges of the pressure chamber and the cylinder, means for connecting the pressure chamber with a force feed lubricating system, a plunger fitting within the cylinder, a leather washer of greater diameter than the plunger secured to the end of the plunger and forming a valve seated on the end of the cylinder, there being an opening in the other end of the plunger, a spring-pressed indicator stem passing through an opening in the front plate and bearing on the plunger, a drain connection for the drain chamber, and a beaded escutcheon plate secured to the front plate.

In testimony whereof I affix my signature in presence of two witnesses.

GEORGE W. MORRIS.

Witnesses:
   FRED H. FOSTER,
   EVELYN CHRISTENSEN.